UNITED STATES PATENT OFFICE.

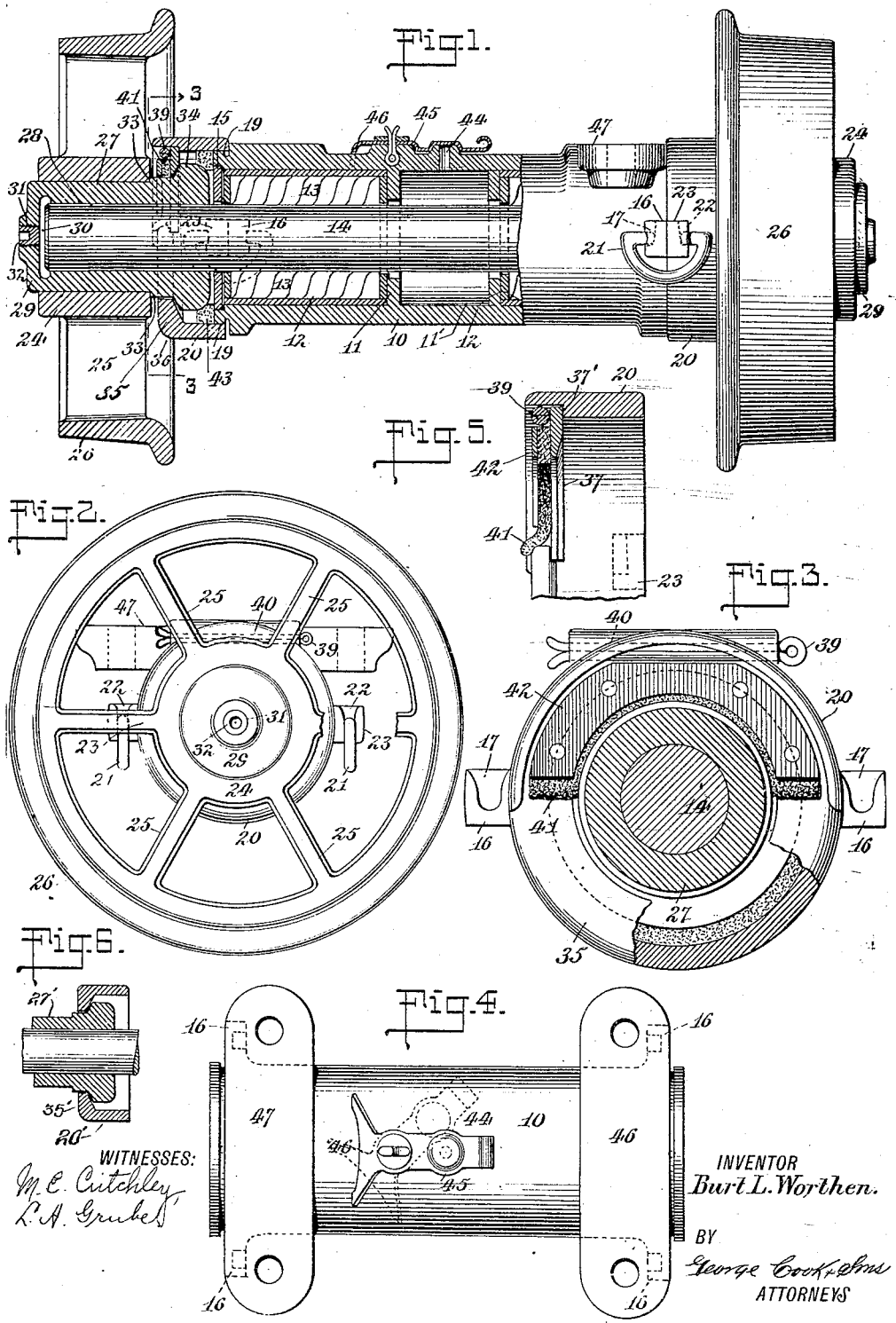

BURT L. WORTHEN, OF SAN FRANCISCO, CALIFORNIA.

CAR WHEEL AND AXLE.

1,284,532.

Specification of Letters Patent.

Patented Nov. 12, 1918.

Application filed July 22, 1916. Serial No. 110,625.

*To all whom it may concern:*

Be it known that I, BURT L. WORTHEN, a citizen of the United States, and a resident of San Francisco, borough of San Francisco, in the county of San Francisco and State of California, have made and invented certain new and useful Improvements in Car Wheels and Axles, of which the following is a specification.

My invention relates to car wheels and axles, and particularly to that type of construction wherein the wheels are loosely secured upon the ends of the car axle so as to rotate thereon, the axle, in turn, being mounted for rotation in suitable bearings contained in a dust-proof housing.

It is an object of the present invention to so construct the axle housing and bearings that the rotating parts will be maintained in a dust-proof, and thoroughly lubricated, condition, so that the construction is particularly adapted for use upon mine cars.

A further object is to provide a car wheel and axle construction of the above type, wherein the wheels may be easily secured to, or detached from, the axle housing, an improved form of securing cap being utilized.

A further object is to provide an improved type of car wheel, wherein the outer and wearing portion is formed of manganese steel, and the inner portion, which rotates upon the car axle, is preferably formed of cast iron or other metal, capable of forming an efficient journal for the car axle.

A further object is to provide a car wheel and axle construction which is particularly adapted for use upon mine or tramway cars, and to this end, is of simple and rugged design throughout, and embodies but few parts.

Other objects and advantages will appear as the description proceeds, wherein it is to be understood that changes in the precise embodiment of my invention can be made within the scope of what is claimed without departing from the spirit thereof.

The preferred embodiment of my invention is disclosed in the accompanying drawings, wherein:

Figure 1 is a view in front elevation, and partially in longitudinal section, of a car wheel and axle construction, embodying the characteristic features of my invention;

Fig. 2 is a view in end elevation thereof;

Fig. 3 is a view in transverse section taken on the line 3—3 of Fig. 1;

Fig. 4 is a top plan view of the axle housing;

Fig. 5 is a fragmental view in section of one of the securing caps, and

Fig. 6 is a fragmental view in section of a modified form of securing cap.

Referring specifically to the several views, the axle housing 10 is provided at its central portion with spaced annular webs 11, defining a central oil well 11', and two spaced bearing compartments 12—12. In each of these bearing compartments, is provided a bearing 13, of any preferred type, which rotatably receive the car axle 14 therethrough. Annular webs 15 are located at the remote extremities of these bearing compartments, and retain the bearing 13 in position, and, in connection with the felt rings 43, prevent the escapement of such oil and grease as is used in connection with these bearings.

In order to hold the wheels to proper gage upon the axle 14, the remote extremities of the housing are reduced so as to form ledges 19, upon which are mounted securing caps 20. The securing caps are rigidly locked to the ends of the axle housing by spanning keepers 21 which fit within suitable slots 17 which are formed within lugs 16 at the ends of the axle housing, and within similar slots 22 formed in the lugs 23, which latter are located upon the securing caps 20 and aline and register with the corresponding lugs of the axle housing.

The securing caps are provided at their free outer extremities with inwardly projecting flanges 35, which fit behind, and rotatably engage, enlarged collars 34 which are carried by the wheels. The wheels are preferably formed of two parts, the hub 24, web or spokes 25, and tire 26, forming one part, and preferably formed of hard wearing metal such as manganese steel, and the retaining member or bushing 27 defining the second part. The retaining member which is forced into the wheel hub under considerable pressure and so becomes a part thereof, is preferably formed of cast iron or other metal, capable of forming an efficient bearing with the axle 14, the latter being received within a bore 28, with which the retaining member or bushing is provided. The outer extremity of the retaining member is provided with a closing wall 29, adjacent which is an oil well or receptacle 30, oil being introduced therein through an opening 31 which is normally closed by a plug 32.

The retaining member is provided with a shoulder 33, which contacts with the extremity of the wheel hub, and insures the proper assemblage of the two. The protruding extremity of the retaining member enlarges to form an annular collar 34, by means of which the wheel is held against shifting lengthwise of the wheel axle. The flange 35, with which each securing cap is provided, is formed in two sections, the lower section 36 being formed integral with the cap, and the upper section 37 being formed as a removable semi-annular plate, normally held in alinement with the lower half of the flange by the cotter key 39, the latter extending through alined openings 40 in the cap. The removable section 37 of the flange seats within a recess 37', which extends behind the plane of the lower section 36 of the flange, providing for the proper alinement of the two sections and the formation of a continuous retaining flange. The flexible washer 41, preferably formed of felt or similar material, is secured to the upper half section 37 of the flange by the metal disk 42, and maintains the bearing between the flange of the securing cap and the collar of the retaining member in a dust-proof and lubricated condition. A ring 43, preferably formed of felt or similar material, is positioned within the retaining cap, and receives the outer extremity of the collar thereagainst, holding the wheel against shifting with relation to the axle housing, without interfering with the free rotation of the former, and, in connection with the annular plate 15, maintains the bearings 13 in a dust-proof condition and retains the oil therein. When desired, one of the wheels may be conveniently removed by disconnecting the securing cap from the axle housing, by first displacing the spanning keepers 21, and withdrawing the wheel and securing cap from the axle and axle housing. The securing cap may then, in turn, be detached from the wheel, by withdrawing the cotter key 39 and removing the upper half 37 of the flange. The securing cap is then lowered and tilted to an inclined position and slipped over the collar of the retaining member; the procedure being exactly reversed when it is desired to secure a wheel to the axle housing. The upper half 37 of the flange being removable, allows a wheel to be used the hub of which has a protruding collar formed directly thereon. It will therefore be apparent that my axle housing construction is not necessarily limited for use in connection with a wheel having a pressed-in bushing or retaining member.

A somewhat modified form of securing cap 20' is disclosed in Fig. 6, wherein the retaining flange 35' is formed as a continuous annular plate integral with the cap itself. In this type of construction, the securing cap is assembled upon the retaining member 27' prior to the insertion of the latter within the wheel hub.

Oil and grease are introduced within the oil compartment 11', through the duct 44. The closing cap 45 is pivotally secured to the housing, and is provided with the enlarged and downwardly turned end 46, which, being formed of resilient material, bears down upon the circular axle housing and retains the cap in its closed position, as illustrated in full lines in Fig. 4. When desired, the cap may be forcibly rotated into the dotted position illustrated in Fig. 4, uncovering the duct 44, and allowing the oil well or compartment 11' to be filled with oil or grease. The axle housing is designed to support the frame or body of a car thereabove, and to this end, is provided with suitable brackets 47.

What I claim is:—

1. The combination with an axle housing, of an axle extending through and rotatably supported by said housing, a wheel rotatably mounted upon each end of said axle and each of which wheels is provided with an annular groove or recess located in proximity with the adjacent end of said housing, and two annular securing caps detachably secured to the ends of said housing and having each a flange, which flanges are adapted to lie within the recesses aforesaid when the parts are assembled.

2. The combination with an axle housing, of an axle extending through and rotatable in bearings carried by said housing, and a wheel at each end of said axle; each wheel having a hollow hub, a bushing located within the opening provided in the hub and rotatable upon the adjacent end of the axle and which bushing is provided with a flange which, in connection with the adjacent end of the hub, provides an annular recess or groove; and two annular securing caps detachably secured to the ends of said housing and having each a flange, which flanges are adapted to lie within the recesses aforesaid when the parts are assembled.

3. A railway wheel comprising a tire or tread portion, a hollow hub, a hollow bushing located within the opening in said hub and the outer end of which is closed, and which bushing is adapted to receive the end of an axle, and a retaining flange formed integrally with said bushing and spaced apart from the end of said hub.

4. A railway wheel comprising a tire or tread portion, a hollow hub, a hollow bushing located within the opening in said hub and adapted to receive the end of an axle, and an outwardly extending retaining flange carried by said bushing and spaced apart from the end of said hub, to thereby provide an annular groove between the hub and flange.

5. A wheel comprising a tire, a hub, and a supporting structure extending therebetween, a retaining member located within said hub, provided with a bore extending therein and stopping short of the outer extremity thereof, the inner extremity of said retaining member provided with a ledge abutting against the hub of said wheel and with an enlarged annular collar spaced from said ledge.

6. A securing cap for a car wheel and axle construction comprising a sleeve, a semi-circular flange projecting inwardly therefrom, a removable semi-annular plate secured to said cap, and forming a continuation of said semi-circular flange.

7. An apparatus of the class described comprising an axle housing formed with end bearing compartments and a central oil compartment therebetween, axle bearings located within said bearing compartments, a shaft extending through, and rotatably mounted within, said bearings, wheels rotatably mounted upon the extremities of said axle, and securing caps rotatably detachably engaging said wheels and removably secured to said axle housing.

8. In combination, an axle housing, bearings located at the opposite extremities thereof, said axle housing formed with an oil compartment located between said bearings, an axle projecting through said bearings, wheels provided with enlarged collars rotatably mounted upon the extremities of said axle, and securing caps removably secured to said axle housing, said securing caps provided with a sectional flange detachably engaging the said wheel collars and holding said wheels against shifting.

9. A wheel and axle construction comprising an axle housing, bearings carried thereby, an axle rotatably engaging said bearings, wheels journaled upon the extremities of said axles, said wheels provided with confronting enlarged collars, securing caps with external lugs, lugs formed upon the extremities of said axle housing, spanning keepers engaging the lugs of the caps and axle housing, for the securement of the two, said securing caps provided with enlarged projecting flanges rotatably seating behind the enlarged collars of said wheels and holding the latter against shifting.

10. A wheel and axle construction comprising an axle housing with a central oil compartment, with a duct communicating therewith, a closing cap for said duct, bearings mounted within said axle housing upon opposite sides of said oil compartment, caps detachably secured to the ends of said axle housing and provided with inwardly extending sectional flanges, the upper section of said flanges removable, wheels with enlarged collars, an axle journaled within the bearings within said axle housing and within suitable openings formed in said wheels, the flanges of said securing caps engaging the collars of said wheels and holding the latter against shifting.

11. In a wheel and axle construction of the class described, an axle housing; an axle extending therethrough and supported thereby; wheels rotatably mounted upon the ends of said axle; non-rotatable securing caps located at the ends of said housing and adapted to engage said wheels to thereby hold them in place upon the ends of said axle; and keepers in engagement with said caps and with the adjacent ends of said housing for detachably securing the two together.

12. In a construction of the class described, securing caps for engaging and rotatably securing the wheels to an axle housing, said securing cap consisting of a sleeve having an inwardly projecting flange, one portion of said flange being removably secured to said sleeve.

13. In a construction of the class described, securing caps for engaging and rotatably securing the wheels to an axle housing, said securing cap consisting of a sleeve having an inwardly projecting flange, one portion of said flange being removably secured to said sleeve, and a pliable washer carried by the upper portion of the flange preventing the entrance of foreign material into the securing cap.

14. A wheel and axle construction consisting of an axle housing, an axle rotatably contained therein, wheels journaled upon said axle, securing caps rotatably engaging said wheels, said securing caps and adjacent portions of said axle housing provided with lugs having downwardly extending recesses therein and spanning keepers seating within the recesses of said lugs and locking the said caps to the said axle housing.

15. A wheel and axle construction consisting of an axle housing, an axle rotatably contained therein, wheels journaled upon said axle, securing caps rotatably engaging said wheels and slidably mounted upon the extremity of said axle housing, resilient keepers extending between said caps and the axle housing locking the same against relative movement.

16. In an apparatus of the class described, the combination with an axle housing, of an axle projecting through and rotatably supported by said housing, wheels rotatably mounted upon the extremities of said axle and having enlarged collars, securing caps removably secured to the ends of said axle housing, and which caps are in engagement with the collars of said wheels, each of said securing caps having an inwardly extending flange the upper portion of which is removable, and a key or pin adapted to engage the removable upper portion of said flange to thereby hold the same in place.

17. A wheel and axle construction comprising an axle housing, an axle extending through and rotatably supported by said housing, wheels rotatably mounted upon the ends of said axle, and which wheels are provided with enlarged collars, each end of said axle housing having a removable securing member provided with an inwardly extending sectional flange in engagement with the collar of the adjacent wheel, and the upper portion of which flange is detachably secured in place.

Signed at San Francisco, borough of San Francisco, in the county of San Francisco and State of California, this 5th day of July, A. D. 1916.

BURT L. WORTHEN.

Witnesses:
C. A. DEGNAU,
W. E. JOHNSON.

Copies of this patent may be obtained for five cents each, by addressing the "Commissioner of Patents, Washington, D. C."